June 1, 1948.  H. PETERS ET AL  2,442,431
SLEEVE INSERTING DEVICE FOR VALVE BAGS
Filed Nov. 29, 1945  9 Sheets-Sheet 1
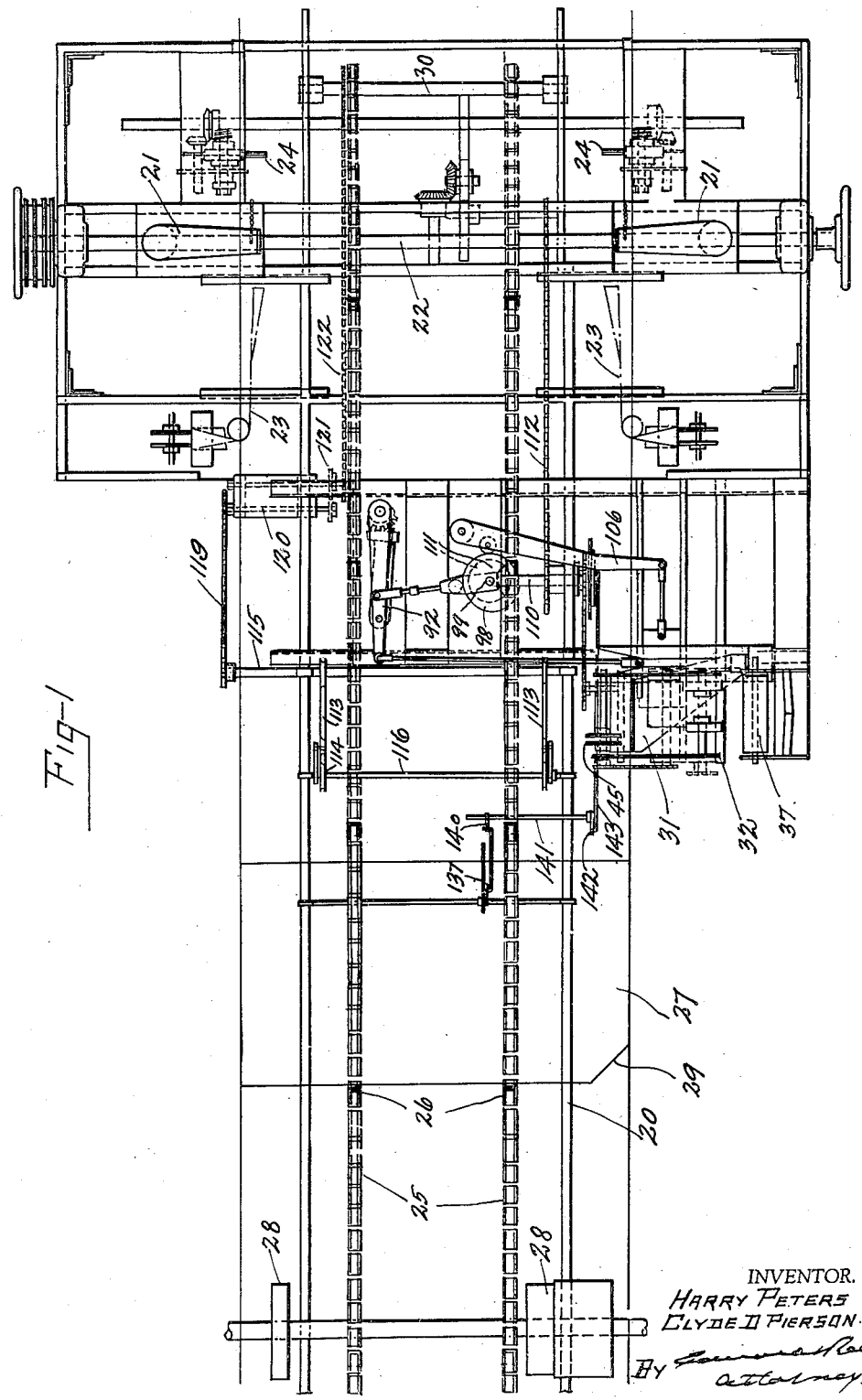
INVENTOR.
HARRY PETERS
CLYDE D PIERSON
By
attorney.

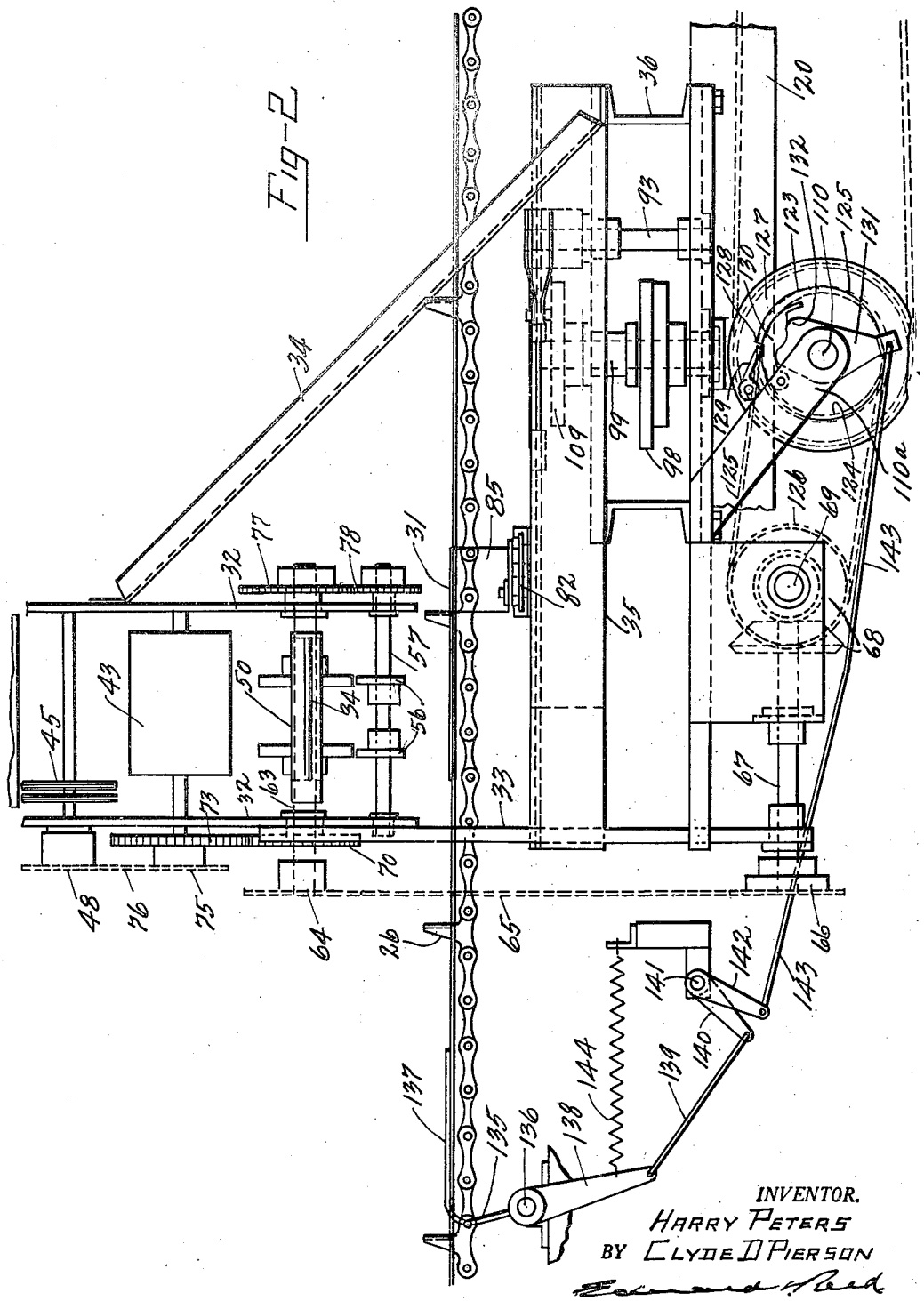

June 1, 1948.  H. PETERS ET AL  2,442,431
SLEEVE INSERTING DEVICE FOR VALVE BAGS
Filed Nov. 29, 1945  9 Sheets-Sheet 3
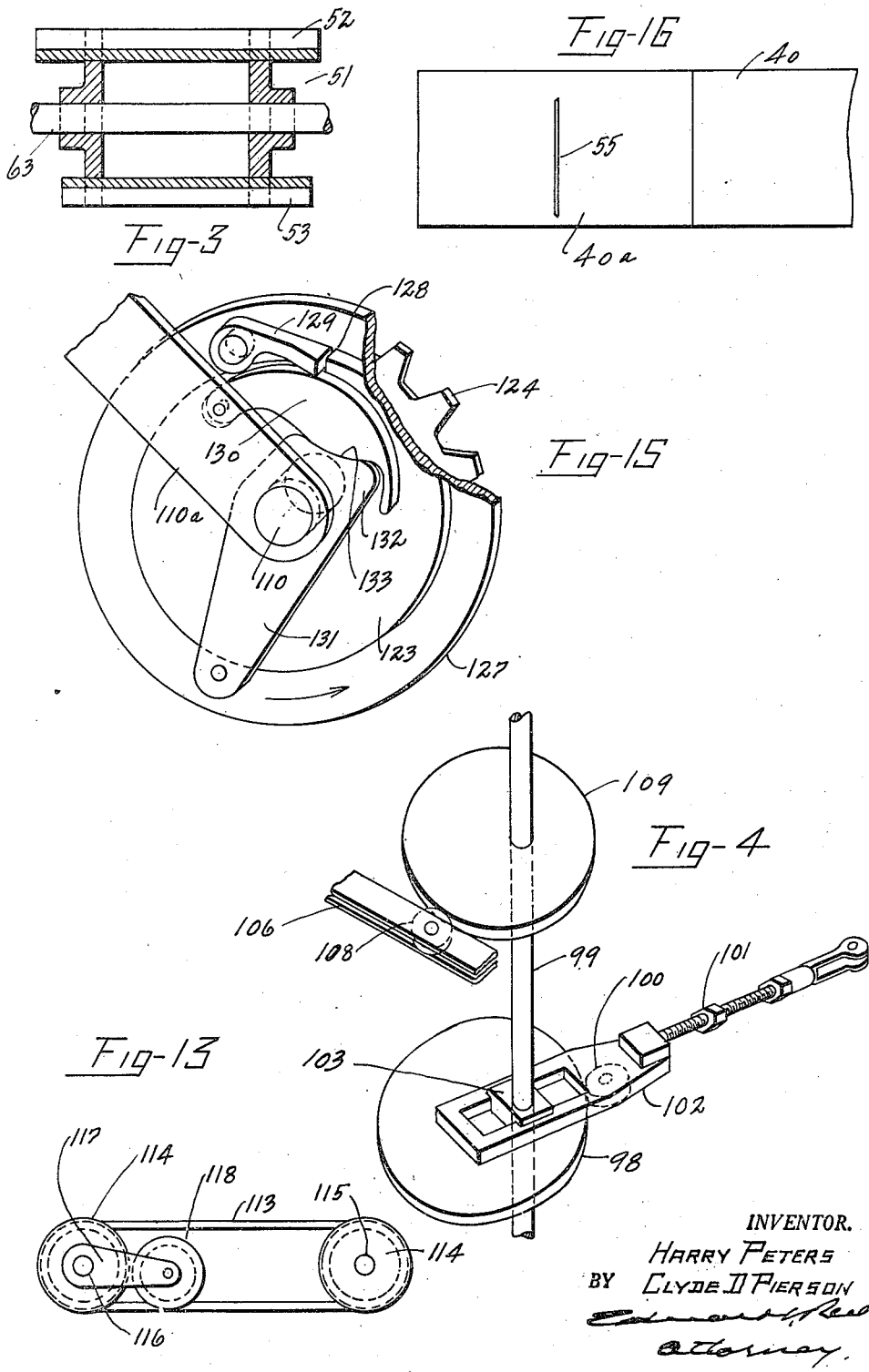
INVENTOR.
HARRY PETERS
CLYDE D PIERSON
BY

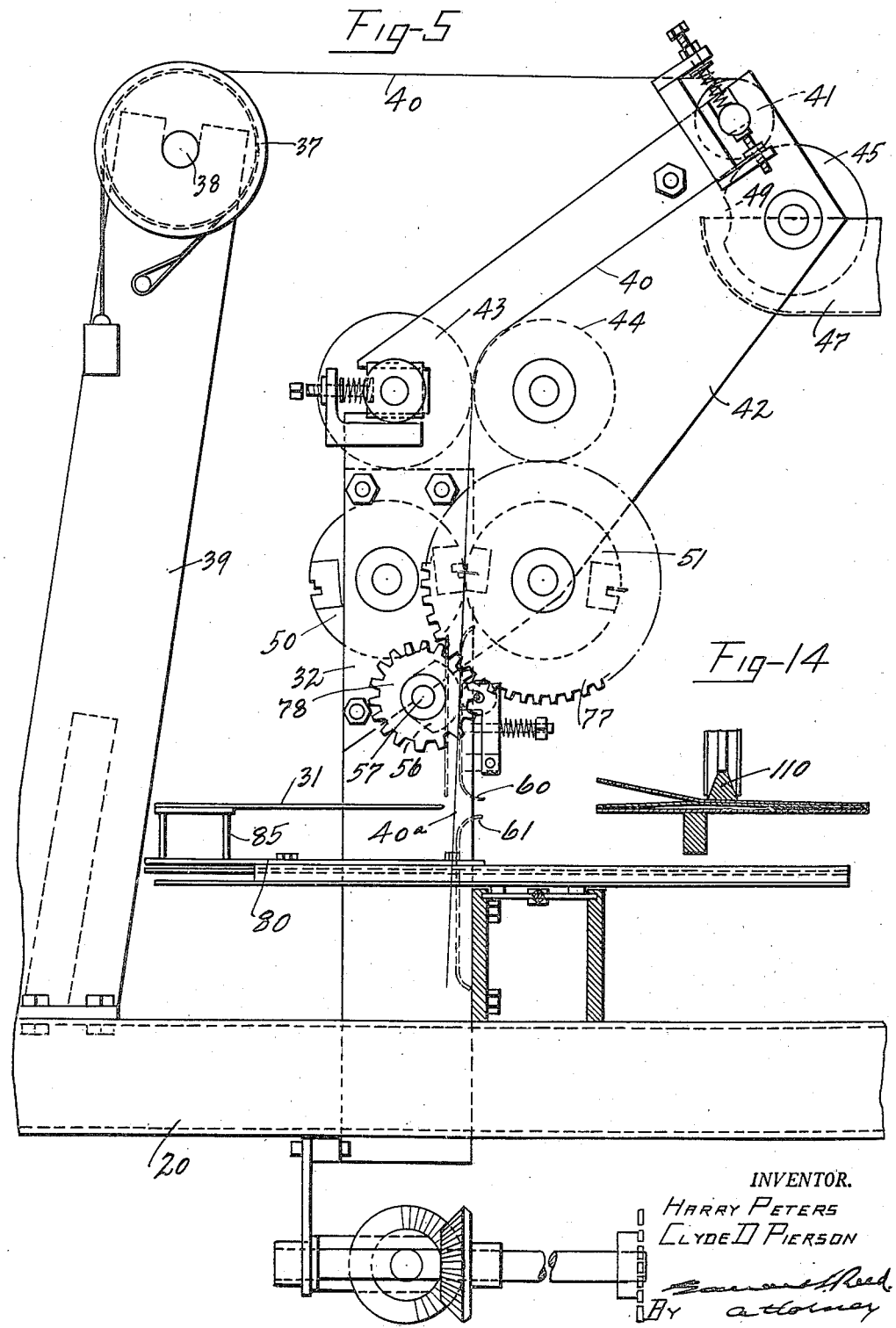

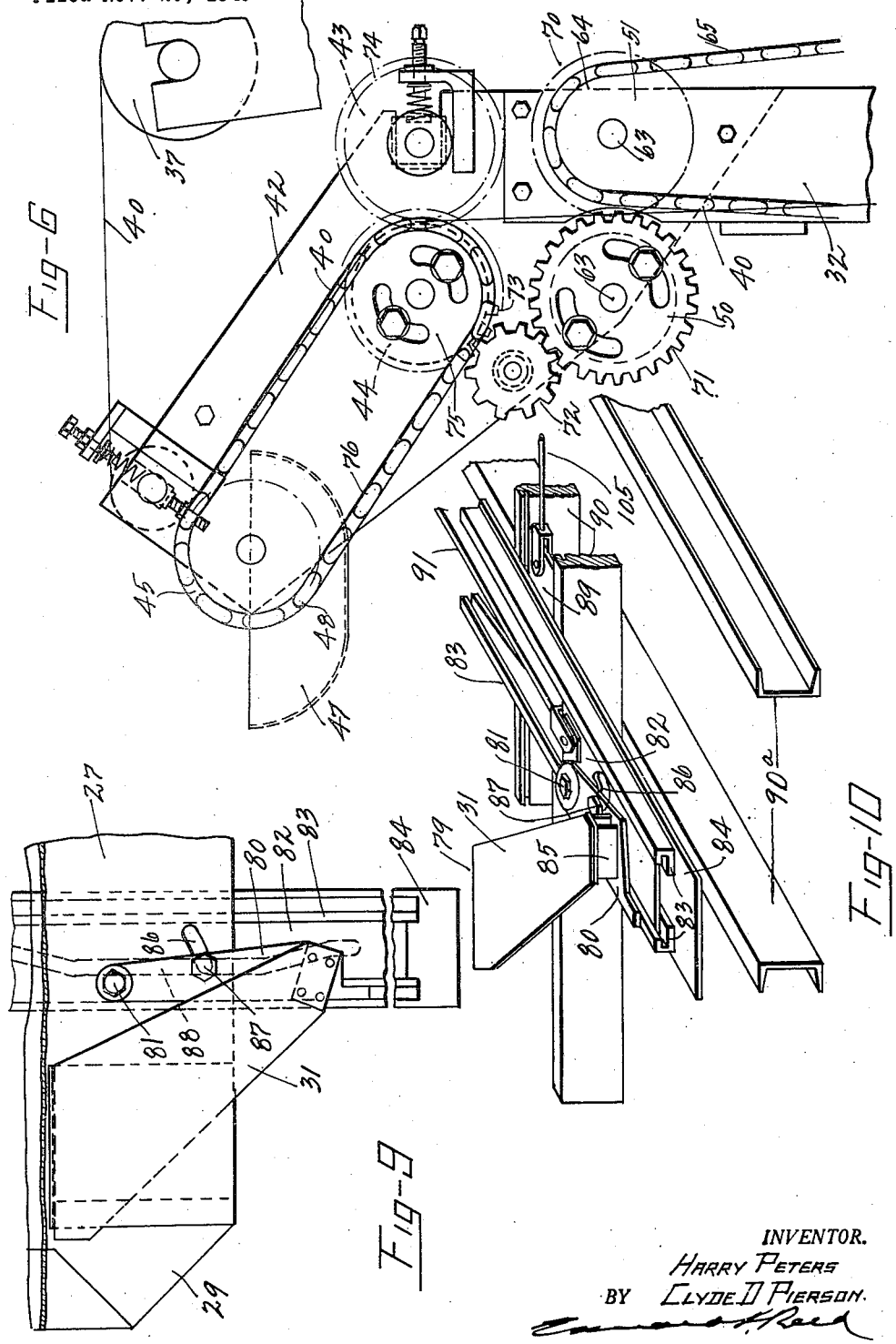

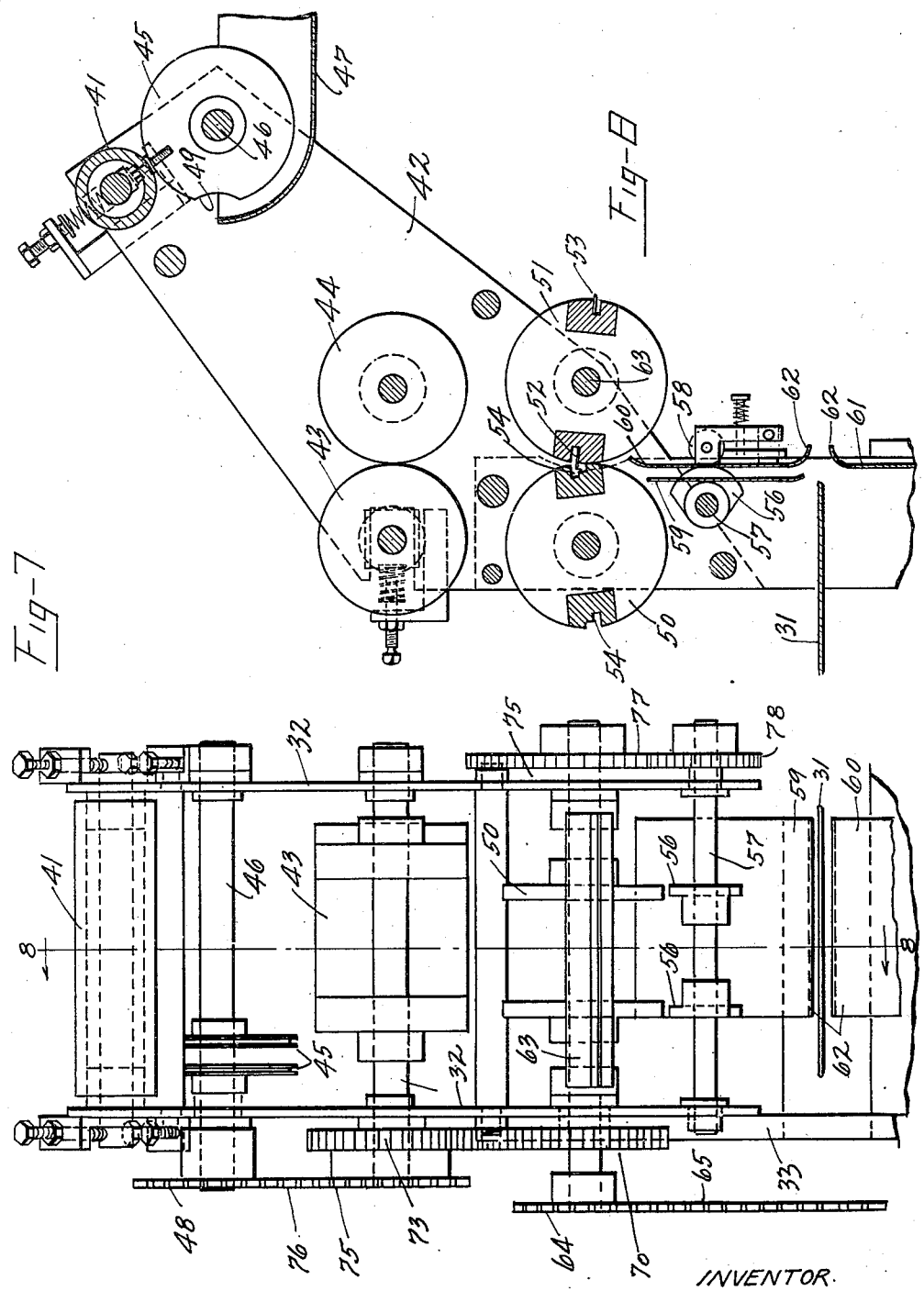

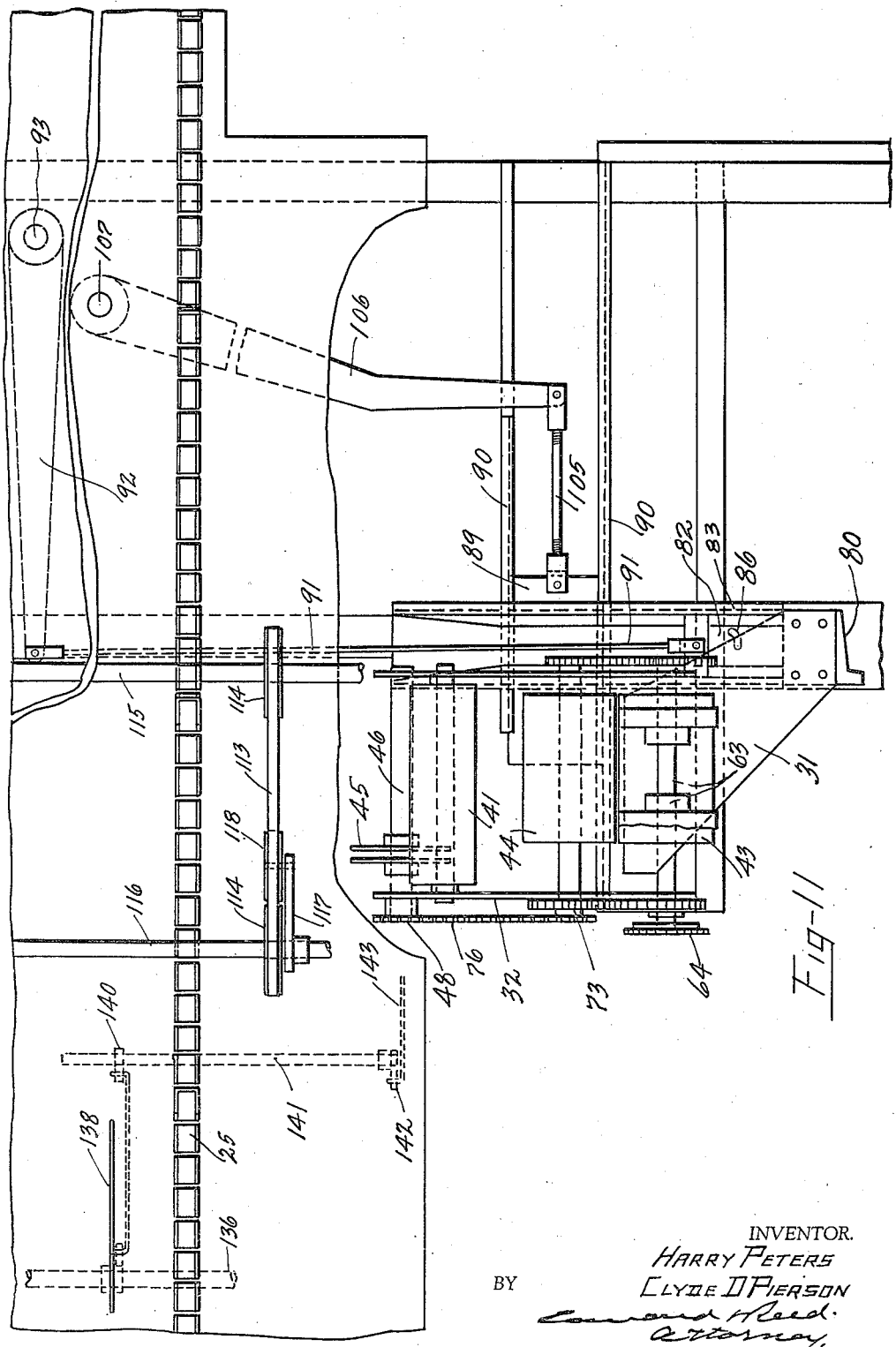

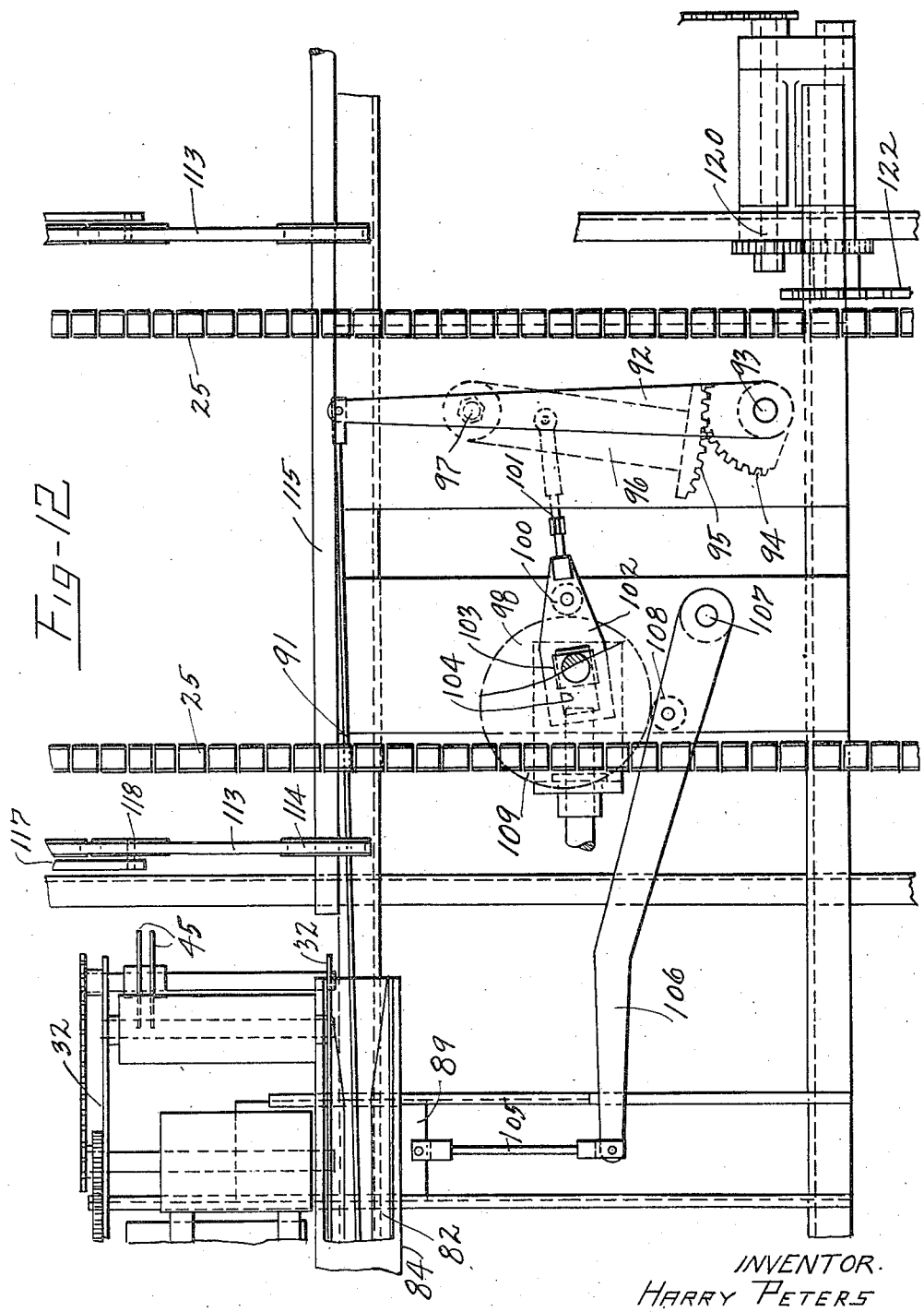

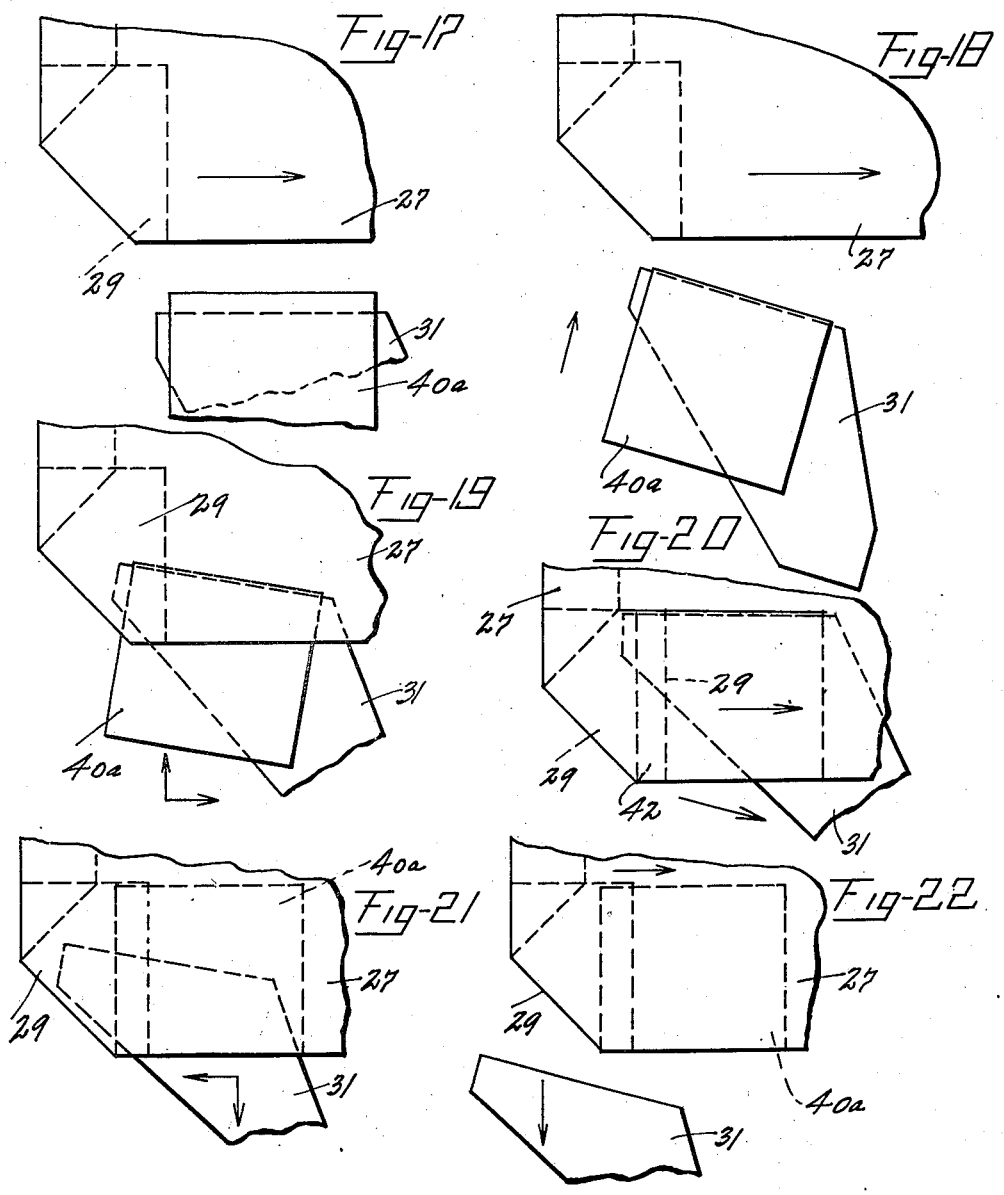

Patented June 1, 1948

2,442,431

UNITED STATES PATENT OFFICE 2,442,431

SLEEVE INSERTING DEVICE FOR VALVE BAGS

Harry Peters and Clyde D. Pierson, Middletown, Ohio, assignors to The Raymond Bag Company, Middletown, Ohio, a corporation of Ohio Application November 29, 1945, Serial No. 631,600

28 Claims. (Cl. 93—8)

This invention relates to a sleeve inserting device and more particularly to a mechanism for inserting a sleeve in the valve of a valved bag.

In a bag of the valved type one corner of the bag is tucked in between the side walls thereof to form a valve through which a filling spout may be inserted to fill the bag and which will be closed by the pressure of the material in the filled bag, as by inverting the bag. The valve is formed of portions of the material, usually paper, of which the bag is formed and for many purposes such a valve satisfactorily closes the filling opening, but when the contents of the bag are of a finely comminuted or powdered nature the material will often seep about the edges of the valve and escape from the bag in an objectionable manner, this being particularly true when the bag is formed of heavy paper or is of the multi-wall type. To prevent this seepage of the material it has been the practice to insert in the valve a sleeve of soft paper, or like material, which projects beyond the inner end of the valve and when subjected to pressure within the bag will tightly seal the filling opening. Such a sleeve must be inserted in the valve after the latter has been tucked and heretofore it has been customary to manually insert the valve in and paste it to the valve. This is a slow and relatively expensive operation and one object of the invention is to provide a mechanism by which the sleeve can be quickly and easily inserted in and secured to the valve.

In a valved bag of the sewed type, the formed and tucked bag section or blank is stitched across both ends thereof to close said ends, except the valved filling opening, and it is a further object of the invention to provide a mechanism which will insert a sleeve in the valve of a bag on the conveyor which moves the same to the sewing mechanism.

A further object of the invention is to provide an inserting mechanism adapted to be mounted alongside the conveyor which carries the bags to the sewing heads and which will sever a section of paper from a web of paper, apply paste thereto, fold the severed section to form a sleeve and insert the formed sleeve in the valve of a bag as the latter is moved past the inserting mechanism by the conveyor.

A further object of the invention is to provide a sleeve inserting mechanism in which the sleeve inserting element will move in the direction of movement of the bag during the inserting operation, whereby the sleeve may be inserted without slowing down or stopping the movement of the bag toward the sewing mechanism.

A further object of the invention is to provide a sleeve inserting element which moves continuously in a circuitous or endless path a portion of which extends into the valve of a bag on the conveyor.

A further object of the invention is to provide a sleeve inserting mechanism including means for successively moving sections of sleeve forming material to a position to be engaged by the inserting element and having means to prevent the operation of the material moving means when there is no bag in sleeve receiving position.

A further object of the invention is to provide a sleeve inserting mechanism which is of a relatively simple construction, positive in operation and can be operated by the driving mechanism for the sewing machine.

Other objects of the invention may appear as the mechanism is described in detail.

In the accompanying drawings, Fig. 1 is a plan view of a bag sewing machine equipped with the present invention; Fig. 2 is a side elevation, partly in section, of a portion of said machine; Fig. 3 is a longitudinal sectional view of the web severing member; Fig. 4 is a detail view of the cam mechanism; Fig. 5 is an elevation of one side of the web feeding mechanism; Fig. 6 is an elevation of a portion of the other side of the web feeding mechanism; Fig. 7 is an elevation of the web feeding mechanism looking toward the conveyor; Fig. 8 is a vertical section taken on the line 8—8 of Fig. 7; Fig. 9 is a plan view of the inserting element and a portion of its operating mechanism; Fig. 10 is a perspective view of inserting element and portions of its operating mechanism; Fig. 11 is a plan view, partly broken away, of a portion of the supporting structure including the sleeve inserting mechanism; Fig. 12 is a plan view of a portion of the machine omitting the table top to show the timing mechanism for the inserting element; Fig. 13 is a side elevation of a hold down belt; Fig. 14 is a section through a portion of a bag and the hold down belt; Fig. 15 is a perspective view of the automatic stop mechanism; Fig. 16 is a plan view of the end portion of the web at the instant it is severed; and Figs. 17 to 22 are diametric views showing successive positions of the inserting element with relation to the valve in which the sleeve is being inserted.

In these drawings we have illustrated one embodiment of the invention and have shown the same arranged to insert sleeves in the tucked valves of bag sections as the latter are moved directly from a valve tucking machine to the sewing mechanism, but it is to be understood that this embodiment has been chosen for the purpose of illustration only and that the sleeve inserting mechanism as a whole, as well as the several parts thereof, may take various forms and the tucked bag sections may be moved to sleeve inserting positions in any suitable manner, as it is not essential that the sleeve inserting mechanism shall be connected with either the sewing mechanism or the valve tucker. It is also to be understood that while the illustrated mechanism is particularly designed for use with gussetted bags it is not limited to that use. The bag sections will be herein referred to as bags, although they are not completed bags at the time the sleeve is inserted.

The valve inserting mechanism as here shown includes an inserting element which is movable into and out of the valve of a bag which is supported in a sleeve receiving position with relation thereto, as by the conveyor of the sewing machine, and when the sleeve is to be inserted in the valve of a moving bag the inserting end of the inserting element also moves in the direction in which the bag is moving during the inserting operation. Sections of sleeve forming material, usually soft paper or the like, are moved successively into a position to be engaged by the inserting element as the latter moves toward the valve. Preferably this section of material is moved to a vertical position in the path of the inserting element and is folded by the inserting element as the latter moves to inserting position. In the present arrangement these sections of sleeve forming material are severed from a web of material which is fed toward a position to be engaged by the inserting element.

In the particular embodiment here illustrated, the sleeve inserting mechanism is associated with and cooperates with a bag sewing machine which comprises a supporting structure or frame 20 on one end of which are mounted two sewing heads 21, which are arranged at the respective sides of the frame and may be driven in any suitable manner, as by a shaft 22 drivingly connected with a suitable source of power, such as an electric motor. A conveyor extends lengthwise of the supporting frame to deliver the bags to the sewing heads and as each bag approaches the sewing head continuous tapes 23 are folded about the respective ends of each bag, which, of course, is then in a flat condition, and the ends of the bags are sewed through these tapes. Beyond the sewing heads are cutters 24 to sever the tapes between adjacent bags. In the present arrangement the conveyor is of the chain type, as shown at 25, and is divided into longitudinal sections by lugs 26, each section being adapted to receive a bag 27 and move the same transversely to its length to the sewing heads. In this particular mechanism, the bags are delivered to the conveyor directly from a valve tucking mechanism, the feed-out rollers 28 only of which are shown. The bags are delivered from the tucking mechanism to the conveyor transversely to their length and with the valved corners 29 at the rear edges of the bags. It is to be understood, however, that neither the sewing mechanism nor the tucking mechanism forms any part of the present invention except in so far as it cooperates with the sleeve inserting mechanism and, if desired, the sleeve inserting mechanism may be operated as a separate unit independently of the sewing mechanism and tucking mechanism. Likewise the conveyor may be of any suitable character and may be driven in any suitable manner. In the present instance it is driven by sprocket wheels on a shaft 30 which in turn is driven from the shaft 22.

As here shown the sleeve inserting mechanism is mounted on the supporting structure of the sewing machine between the sewing heads and the tucking mechanism, at that side of the conveyor along which the valved ends of the bags move. The inserting mechanism includes an inserting element 31 which is supported by the main supporting structure for movement into and out of the valves of the bags as they are moved to sleeve receiving position, the inserting element making one complete cycle of operations for each bag, in a manner to be hereinafter described. The inserting mechanism also includes means for moving the sections of sleeve forming material into the path of the inserting element as the latter moves toward the bags. When, as in the present instance, the sections of material are to be severed from a continuous web of material, the material feeding mechanism may be of the type here shown, in which it comprises a frame, including side members 32, which is supported on the supporting structure slightly above the level of the conveyor by standards 33 and 34 secured respectively to frame members 35 and 36 on the main supporting structure. The standard 34 is arranged in an inclined position to avoid interference with the operation of the inserting element 31.

In the material feeding mechanism here shown the web of material is supported in roll form, as shown at 37, on a shaft 38 rotatably mounted in the upper end of an upright frame 39 which is mounted on the main supporting structure independently of the feeding mechanism. The web 40 leads from the roll 37 about a guide roller 41 supported on arms 42 which extend upwardly and inwardly from the side frame members 32 and thence between feeding rollers 43 and 44 by which it is drawn from the roll and advanced. Associated with and preferably arranged beneath the roller 41 is a paste applying device here shown as including two circular disks 45 mounted on a shaft 46 and extending into a paste receptacle 47, the shaft being driven by a sprocket wheel 48. The guide roller 41 presses the web lightly against the paste applying disks and as the latter rotate they apply two lines of paste to the lateral portion of the under-surface of the web, which constitutes the outer sides of the sleeves formed from the web. The disks are provided with peripheral recesses 49 so that the paste lines on the web are interrupted on the lines at which the sections are to be severed. The web passes from the feeding rollers 43 and 44 to a severing device including rollers 50 and 51. The roller 51 carries a severing blade 52 and a slitting blade 53, and the roller 50 is provided with recesses 54 forming cutting shoulders to cooperate with the respective blades. The blade 52 is of a length at least as great as the width of the web so as to sever a section of the web upon each rotation of the roller 51. The slitting blade 53 is of a length less than the width of the web so as to form in the latter a slit 55 (Fig. 16) extending for a portion only of the width of the web. The width of the severed section of the web constitutes the length of the sleeve as inserted in the valve and it is desirable that that portion of the sleeve which extends beyond the valve shall be divided into two parts to enable it to be crushed into tight sealing form. However, it is also desirable that both lateral edges of the section should be continuous at the time of insertion so as to provide proper contact with the inserting element during the inserting operation. Therefore, as shown in Fig. 16, one end of the slit 55 is spaced from that edge of the severed section which forms the outer end of the sleeve such a distance that when the sleeve has been inserted the slit will terminate adjacent the inner end of the valve. The other end of the slit terminates a short distance from that edge of the web section which forms the inner end of the sleeve so as to provide an edge portion which is continuous during the inserting operation but may be easily broken to completely separate the two inner portions of the sleeve. As the end portion of the web moves beyond the severing device it is engaged by a supplemental feeding device, here shown as segments 56 carried by a shaft 57 and cooperating with an idle roller 58, to continue the movement of the end portion of the web after it has been severed from the body of the web. Preferably spaced guide plates 59 and 60 are arranged on opposite sides of the lower end portion of the web to maintain the same in an upright position as it moves downwardly and after it has been severed. Arranged below the plate 60 is a second guide plate 61 and the adjacent edges of the plates 60 and 61 are curved in the direction in which the inserting element 31 moves, as shown at 62, and are so arranged that the inserting element 31 moves between the same after it has engaged the severed section of the material and these curved parts 62 fold the upper and lower portions of the section about the inserting element. Preferably the operations of the feeding device and the inserting element are so timed that the inserting element will contact the severed section on a line substantially coincident with the slit 55. The segments 56 are so timed that they engage the end portion 40a of the web just prior to the slitting operation and hold the web taut during slitting and then during severance. After severance the segments advance the severed portion of the web into the path of the inserting element and then release the same substantially at the instant it is engaged by the inserting element.

The web feeding mechanism may be driven in any suitable manner and from any suitable source of power. As here shown, in Fig. 2, one end of the shaft 63 of the cutter roll 51 has secured thereto a sprocket wheel 64 which is connected by a sprocket chain 65 with a sprocket wheel 66 on a shaft 67 (Fig. 2) which is driven through bevel gearing 68 from a shaft 69 which is driven in a manner to be hereinafter described. A gear 70 on the shaft 63 meshes with the gear 71 on the shaft of cutter roller 50 and the latter gear is connected through intermediate gearing 72 (Fig. 6) with a gear 73 on the shaft of the feeding roll 44, which gear also meshes with the gear 74 on the feeding roll 43. Rigidly connected with the gear 73 is a sprocket wheel 75 which is connected by a chain 76 with the sprocket wheel 48 on the shaft of the paste applying device. A gear 77 on the shaft 63 meshes with a gear 78 on the shaft 57 of the supplemental feeding device.

The sleeve inserting element 31 may be of any suitable character and may be operated by any means which will impart the desired movements thereto. As here shown, it is in the form of a plate, or wide arm, the edge walls of which converge outwardly and the inner or sleeve engaging edge 79 of which is at an acute angle to the length of the arm. The outer end of the inserting element is rigidly secured to a supporting member 80 which is pivotally mounted at 81 on a plate 82 slidably mounted in guideways 83 carried by a second plate 84. Preferably a block 85 is interposed between the end of the inserting element and the pivoted plate 80 to support the inserting element at the proper height with relation to the conveyor. The plate 82 is provided with an arcuate slot 86 and a stud 87 rigidly mounted in the pivoted arm 80 extends through the slot and into a cam groove 88 in the plate 84. The guides 83 and their supporting plate 84 extend transversely to the conveyor and are rigidly secured to a second plate 89 slidably mounted in guideways 90 which extend lengthwise of and substantially parallel with the conveyor and are supported on frame members 90a rigid with the main supporting structure. Means are provided for moving the plates 82 and 89 simultaneously in their intersecting paths and to thus cause the inserting element to move in a circuitous or endless path a portion of which path extends through the valve of a bag which is in sleeve receiving position on the conveyor, the relative movements of the two slide plates being so timed that the sleeve engaging end 79 of the inserting element will move from an initial position, as shown in Fig. 5, into engagement with the severed section 40a of sleeve forming material and move that material between the guide members 60 and 61 to fold the section about the forward portion of the inserting element into a sleeve form and then move the same toward and into the valve on the bag which is in sleeve receiving position, and at the same time will move in the direction of movement of the bag and then out of the valve and back to its initial position. During this circuitous movement of the inserting element the movement of the stud 87 in the cam groove 88 will cause the stud to move the supporting member 80 and therefore the inserting element about the pivotal axis 81 thereby moving the sleeve engaging edge of the inserting element to an angular position with relation to the end of the bag as it approaches the latter. Thus the corner of the sleeve inserting element will first enter the valve, or the open end of the bag adjacent the valve, thereby facilitating the insertion of the sleeve.

These movements are diametrically illustrated in Figs. 17 to 22. In Fig. 17 the section of sleeve forming material 40a has been folded about the inserting element 31 into sleeve form and has been advanced well on its way toward the bag 27, in the valve 29 of which the sleeve is to be inserted, the outer end of the sleeve being adjacent the inner end of the valve. In Fig. 18 the inserting device has moved further toward the bag and at the same time the bag has moved forward slightly with relation to the sleeve and due to the movement of the stud 87 in the slot 88 the inserting device has been moved slightly about its axis 81 so that the sleeve engaging edge thereof extends at an acute angle to the end of the bag and the outer or rear corner of the inserting element is about to enter the valve. In Fig. 19 the folded sleeve has been partially inserted in the valve 29 in overlapping relation to the inner edge of the valve and the inserting element is moving both toward bag and in the direction of the movement of the bag. In Fig. 20 the inward movement of the inserting element has been completed, the sleeve is fully inserted and the inserting element is beginning its outward movement while it still moves in the direction of movement of the bag. In Fig. 21 the inserting device is moving outwardly from the inserted sleeve, and the bag and sleeve are moving forwardly with relation thereto. In Fig. 22 the inserting device has been fully withdrawn and is moving rearwardly toward its initial position.

The relative movements of the plates 82 and 84, which control the movement of the inserting element, may be imparted thereto in any suitable manner but preferably this movement is effected by cams moving in unison. As shown in Figs. 11 and 12 the plate 82 on which the inserting element 31 is supported is connected by a rod 91 with an arm 92 pivotally mounted on a vertical shaft 93 and extending substantially parallel with the conveyor. Secured to the shaft 93 is segmental gear 94 which meshes with a segmental gear 95 on the adjacent end of a second arm 96 which is mounted on a vertical axis 97. Thus the movement of the arm 96 about its axis causes the arm 92 to rotate about its axis and to move the inserting element in a direction transverse to the conveyor. Movement is imparted to the arm 96 by a cam 98 mounted on the lower portion of a vertical shaft 99 and acting on a roller 100 carried by a connecting rod 101 which is pivotally connected with the arm 96 (see Fig. 4). The roller is supported in proper contact with the periphery of the cam by a yoke 102 having a guideway or slot 104 to receive and slidably engage a block 103 which is rotatably supported on the shaft 109.

The slide plate 89 which moves parallel with the conveyor is connected by a rod 105 with one end of an arm 106 which is pivotally mounted on a vertical axis 107. A roller 108 carried by the arm 106 contacts the peripheral edge of a second cam 109 which is also secured to the shaft 99, thus the two arms, 92 and 106, are simultaneously actuated in accurately timed relation to actuate the slide plates and thus impart the circuitous movement to the inserting element. The shaft 99 and the cams carried thereby are preferably driven from a moving part of the sewing machine mechanism and, as here shown, a transverse shaft 110 is connected with the shaft 99 by bevel gearing 111 and is driven by a sprocket chain 112 from the sewing machine shaft 22 (Fig. 1).

Means are also provided for preventing the displacement of the bag on the conveyor during the sleeve inserting operation and for separating the end portions of the side walls of the bag and the valve to facilitate the insertion of the sleeve. For this purpose we prefer to employ hold down belts 113 which are supported above and in engagement with the bags as they are advanced by the conveyor (Figs. 12, 13 and 14). In the arrangement shown, the belts are carried by pulleys 114 mounted respectively on parallel shafts 115 and 116. Arms 117 pivotally mounted on the shaft 116 carry rollers 118, in the nature of belt tighteners, which are arranged between the upper and lower stretches of the respective belts to press the lower stretches thereof into contact with the bags. The hold-down belts are positively driven at such a speed with relation to the movement of the conveyor that both belts will be moved at exactly the same speed as the conveyor and there will be no tilting or lateral displacement of the bag. In the present arrangement the shaft 115 is driven by a sprocket chain 119 from a second shaft 120 which in turn is driven through gearing 121 and a sprocket chain 122 from the shaft 30 which drives the conveyor. The hold down belt 113 adjacent the valved end of the bag contacts the bag on a line adjacent the transverse end of the valve and the pressure of the belt tends to spread apart the ends of the side walls of the bag and of the valve itself so as to slightly separate these walls and facilitate the entrance of the inserting element and sleeve.

We have also provided means for automatically preventing the feeding of sections of sleeve forming material to the inserting element when there is no bag in a position to receive the sleeve. As here shown (Figs. 2 and 15), a disk-shaped driving member 123 is mounted on and rigidly connected with the shaft 110 which operates the cam mechanism to control the movement of the inserting element. Loosely mounted on the shaft 110 is a driven member, such as a sprocket wheel 124, which is driven by the driving member and is connected by a chain 125 with a sprocket wheel 126 on the shaft 69 which drives the web feeding mechanism, thus causing the web feeding mechanism to be operated in accordingly timed relation to the operation of the inserting element. Loosely mounted on the shaft 110 and rigidly connected with the driving member is a disk 127 of a greater diameter than the driving disk 123. The driving disk is provided with a peripheral recess which forms a shoulder 128, and a pawl 129, pivotally mounted on the disk 127, normally engages the shoulder 128, thus connecting the driving member with the driven member. Pivotally mounted on a fixed support, such as the brace 110a in which the end of the shaft 110 is mounted, is an arcuate trip finger 130, the outer edge of which is normally spaced inwardly from the peripheral edge of the driving disk and from the shoulder 128. The nose of the pawl 129 projects laterally beyond the disk 127 and overhangs the trip finger 130. A lever 131 is pivotally mounted on the shaft 110 and has a part 132 extending upwardly beyond the shaft and having supporting engagement with the trip finger. The contacting surfaces of the lever and the trip finger are so shaped that when the lever is in its normal or inoperative position the trip finger will be in its normal inoperative position and the pawl may move over the same without being actuated thereby, but when the lever has been moved to an operative position the part 132 supports the trip finger in an elevated position with its curved upper edge in the path of the pawl 129, so that the pawl will be moved out of engagement with the shoulder as it rides over the trip finger, thereby interrupting the driving connection between the shaft and the mechanism which feeds the sections of material to the inserting element. Preferably the trip finger is provided on its inner edge with a cam surface 133 to engage the part 132 of the lever and thus positively move the trip finger outwardly. The position of the lever 131 is controlled by the bags as they are advanced by the conveyor to sleeve receiving position. As shown in Fig. 2 the conveyor chains are provided with lugs 26, the lugs on each chain being spaced apart distances slightly greater than the width of the bags. Thus the conveyor is divided into sections each adapted to receive a bag and in the event a bag is not delivered to one of those sections the controlling means operates to move the lever 131 to its operative position and thus interrupt the operation of the web feeding mechanism.

The controlling means of the lever may take various forms but as here shown an arm 135 is mounted on a shaft 136 below the conveyor and extends upwardly beyond the conveyor and has a portion 137 which is movable into a position close to and parallel with the conveyor. A crank arm 138 is rigidly secured to and extends downwardly from the shaft and is connected by a rod 139 with a crank arm 140 on a second shaft 141 and a second arm 142 mounted on the shaft 141 is connected by a rod 143 with the end of the lever 131. A spring 144 acts on the crank arm 138 to move the rods in a direction to move the lever 131 counter-clockwise to its operative position, that is to a position to interrupt the operation of the driving mechanism. This movement of the crank arm rocks the arm 135—137 about the axis of the shaft 136 to an upwardly inclined position and the next bag which is being advanced by the conveyor engages the inclined portion of the arm and moves the same to its horizontal position, thereby restoring the lever 131 to its inoperative position. The spacing between adjacent bags is much less than the length of the horizontal portion 137 of the arm and, therefore, so long as there is a bag on each section of the conveyor the lever 131 will be retained in its inoperative position and the driving connection with the web feeding mechanism will be maintained. When a section of the conveyor which is about to enter sleeve receiving position is empty the arm 137 will be retained in its horizontal position by the bag in the next preceding section until the cycle of operations for inserting the sleeve in that bag is in progress and the pawl 129 has moved beyond the trip finger 130. The further movement of said preceding bag releases the arm 137 and permits the spring 144 to actuate the lever 131 and cause the part 132 thereof to engage the cam surface on the trip finger and move the latter into and firmly support the same in the path of the pawl, so that the pawl will ride over the trip finger and be moved out of engagement with the shoulder on the driving member just as said cycle of sleeve inserting operations is completed, thereby interrupting the operation of the web feeding mechanism.

It will be noted that the disconnection of the driving and driven members may be effected only at the end of a complete rotation of the shaft 110, when the pawl engages the trip finger. The lever and trip finger remain in their operative positions, with the pawl in an inoperative position, until a bag on the conveyor depresses the arm 137 and moves the lever to its inoperative position. When this occurs the pawl engages the periphery of the driving member and is engaged by the shoulder on the latter to re-establish the driving connection as the bag enters sleeve receiving position. Thus the operation of the web feeding mechanism can be interrupted only after the sleeve has been inserted in the valve of a bag which is in sleeve receiving position and the driving connection will be re-established when the bag in a conveyor section following the empty section enters sleeve receiving position, regardless of how many sections of the conveyor may have been empty.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In a mechanism for inserting a sleeve in the previously formed valve of a bag, means for supporting a valved bag with its valve in a position to receive the sleeve, a sleeve inserting element movable into and out of said valve, means for supporting a section of sleeve forming material in a position to be engaged by said inserting element as it moves toward said valve, and means for actuating said inserting element to insert the sleeve in said valve.

2. In a mechanism for inserting a sleeve in the valve of a bag, means for supporting a valved bag with its valve in a position to receive the sleeve, a sleeve inserting element movable toward and from a valve in said position, means for supporting a section of sleeve forming material in a position spaced from said valve and in the path of said inserting element, and means for actuating said inserting element to cause the same to engage said material and insert the same in said valve in sleeve form.

3. In a mechanism for inserting a sleeve in the valve of a bag, means for supporting a valved bag with its valve in a position to receive the sleeve, a sleeve inserting element movable into and out of said valve, means for moving a section of flexible material into the path of movement of said inserting element toward said valve, means cooperating with said inserting element to fold said flexible material into sleeve form, and means for actuating said inserting element to form the sleeve, to insert the formed sleeve in the valve and to withdraw the same from the inserted sleeve.

4. In a mechanism for inserting a sleeve in the valve of a bag, means for supporting a valved bag with its valve in a position to receive the sleeve, a sleeve inserting element movable in an endless path into and out of a valve which is in said sleeve receiving position, and means for supporting a section of sleeve forming material in a position to be engaged by said inserting element and moved thereby into said valve, and means for actuating said inserting element.

5. In a mechanism for inserting a sleeve in the valve of a bag, means for successively advancing valved bags in a predetermined path to move the valves thereof to and beyond a position to receive the sleeve, a sleeve inserting element movable toward and from said sleeve receiving position, means for moving sections of flexible material successively into the path of movement of said inserting element toward said sleeve receiving position, means cooperating with said inserting means to fold said section of material into sleeve form, and means for moving said inserting element in a circuitous path in timed relation to the movement of each bag to cause the same to engage a section of said flexible material, fold the same, insert the folded material in the valve which is in sleeve receiving position, to be withdrawn from the inserted sleeve and to be returned to a position to engage another section of said flexible material.

6. In a mechanism for inserting a sleeve in the valve of a bag, means for supporting a valved bag with its valve in a position to receive the sleeve, a sleeve inserting element movable continuously in an endless path into and out of a valve which is in said sleeve receiving position, and means for moving sections of sleeve forming material successively and in timed relation to the movement of said inserting element into a position to be engaged by said inserting element and moved thereby into the valves of successive bags.

7. In a mechanism for inserting a sleeve in the valve of a bag, means for supporting a valved bag with its valve in a position to receive the sleeve, a sleeve inserting element movable continuously in an endless path into and out of a valve which is in said sleeve receiving position, means for moving sections of sleeve forming material successively and in timed relation to the movement of said inserting element into a position to be engaged by said inserting element and moved thereby into the valves of successive bags, and means for applying paste to a portion only of each section of material before it is inserted in said valve.

8. In a mechanism for inserting a sleeve in the valve of a bag, means for successively moving valved bags continuously through a sleeve receiving position, a sleeve inserting element movable toward and from said sleeve receiving position, means for successively positioning sections of flexible material in the path of said inserting element, and means to actuate said inserting element to insert said material in the valve of a bag which is in said receiving position and to move said inserting element in the direction of movement of said bag during the inserting operation.

9. In a mechanism for inserting a sleeve in the valve of a bag, means for supporting a valved bag with its valve in a position to receive the sleeve, a sleeve inserting element movable into and out of said valve, means for moving the end portion of a web of sleeve forming material into the path of said inserting element, means for severing said end portion from said web, and means for actuating said inserting element to cause it to engage the severed portion of said web between the ends thereof and move the same into said valve.

10. In a mechanism for inserting a sleeve in the valve of a bag, means for supporting a valved bag with its valve in a position to receive the sleeve, a sleeve inserting element movable into and out of said valve, means for moving the end portion of a web of sleeve forming material into the path of said inserting element, means for severing said end portion from said web and for forming a transverse slit in said end portion, and means for actuating said inserting element to cause the same to engage said severed end portion adjacent said slit and move the same into said valve.

11. In a mechanism for inserting a sleeve in the valve of a bag, means for supporting a valved bag with its valve in a position to receive the sleeve, a sleeve inserting element movable into and out of said valve, means for moving the end portion of a web of sleeve forming material into the path of said inserting element, means for severing said end portion from said web, means for actuating said inserting element to cause it to engage the severed portion of said web between the ends thereof and move the same into said valve, and members arranged above and below the path of said inserting element to engage said severed portion of said web and fold the same about said inserting element.

12. In a mechanism for inserting a sleeve in the valve of a bag, means for supporting a valved bag with its valve in a position to receive the sleeve, a sleeve inserting element movable into and out of said valve, means for moving the end portion of a web of sleeve forming material into the path of said inserting element including feed rollers supported above said inserting element, a severing device below said rollers, and means below said severing device to move the severed end portion of said web to a position to be engaged by said inserting element, and means for actuating said inserting element in timed relation to said material moving means to cause it to engage the severed portion of said web to move the same into said valve.

13. In a mechanism for inserting a sleeve in the valve of a bag, means for supporting valved bags successively with their valves in a position to receive a sleeve, a sleeve inserting element movable into and out of said valves, means for moving the end portion of a web of sleeve forming material into the path of said inserting element including means to apply paste to one surface of said web adjacent the edge thereof, feed rollers of a length less than the width of said web, a rotatable cutting device having a severing blade and a slitting blade of a length less than the width of said web, and a supplemental feeding device to impart final forward movement to the severed portion of said web, and means for continuously operating said web moving means and said inserting element in timed relation one to the other to cause said inserting element to engage each severed portion of said web and move the same into a valve.

14. In a combination with a bag sewing machine including a sewing head and a conveyor to move valved bags transversely to their length toward said sewing head, sleeve inserting mechanism mounted at one side of said conveyor adjacent the valved ends of said bags and comprising a sleeve inserting element and means for supporting a section of sleeve forming material in a position between said inserting element and said conveyor, and means for operating said sleeve inserting mechanism in timed relation to the movement of said conveyor to cause sections of sleeve forming material to be inserted in the valves of the bags on said conveyor as they are moved successively to sleeve receiving position.

15. In a combination with a bag sewing machine including a sewing head and a continuously moving conveyor to advance valved bags toward sewing head successively and transversely to their length, a sleeve inserting element supported at one side of said conveyor adjacent the valved ends of said bags for movement into and out of the valve of a bag which is being advanced by said conveyor and for movement in a direction of said bag, means for successively moving sections of sleeve forming material to upright positions in the path of said inserting element as the latter moves toward said conveyor, means cooperating with said inserting element to fold each section of said material about said inserting element the latter is moved toward said conveyor, and means for actuating said inserting element and said material moving means in timed relation to said conveyor to cause a folded section of sleeve forming material to be inserted in the valve of each bag as the latter moves toward said sewing head.

16. In a combination with a bag sewing machine including a sewing head and a continuously moving conveyor to advance valved bags toward said sewing head successively and transversely to their length, a sleeve inserting element supported at one side of said conveyor adjacent the valved ends of said bags for movement into and out of the valve of a bag which is being advanced by said conveyor and for movement in the direction of movement of said bag, means for successively moving sections of sleeve forming material to upright positions in the path of said inserting element as the latter moves toward said conveyor, means cooperating with said inserting element to fold each section of said material about said inserting element as the latter is moved toward said conveyor, means acting on each bag as the latter is advanced by said conveyor to separate the end portions of the side walls thereof adjacent said valve, and means for actuating said inserting element and said material moving means in timed relation to said conveyor to cause a folded section of sleeve forming material to be inserted in the valve of each bag as the latter moves toward said sewing head.

17. In a combination with a bag sewing machine including a sewing head and a conveyor having longitudinally spaced sections to receive valved bags and move the latter transversely to their length toward said sewing head, valve inserting mechanism mounted at one side of said conveyor adjacent the valved ends of said bags and comprising a sleeve inserting element and means for moving a section of sleeve forming material to a position between said inserting element and said conveyor, means for operating said sleeve inserting mechanism in timed relation to the movement of said conveyor to cause sections of sleeve forming material to be inserted in the valves of the bags in said conveyor as they are moved successively to valve receiving position, and means controlled by the bags on said conveyor for preventing the operation of said material moving means when there is no bag on that section of said conveyor which is about to move into sleeve receiving position.

18. In a mechanism for inserting a sleeve in the valve of a bag, a sleeve inserting element, a movable member on which said inserting element is mounted, a second movable member connected with the first mentioned member, and means for moving said members simultaneously in different directions to move said inserting element in a predetermined path.

19. In a mechanism for inserting a sleeve in the valve of a bag, a sleeve inserting element, a member slidably supported for movement in a predetermined path, a second member connected with the first mentioned member for movement therewith and for movement with relation thereto in a path transverse to the path of said first mentioned member, means for supporting said inserting element on said second member for movement therewith, and means for simultaneously actuating said members.

20. In a mechanism for inserting a sleeve in the valve of a bag, a sleeve inserting element, a member slidably supported for movement in a predetermined path, a second member connected with the first mentioned member for movement therewith and for movement with relation thereto in a path transverse to the path of said first mentioned member, means for pivotally supporting said inserting element on said second member, means controlled by the movement of said second member to move said inserting element about its pivotal axis, and means for simultaneously actuating said members.

21. In a mechanism for inserting a sleeve in the valve of a bag, a conveyor for moving valved bags successively to a sleeve receiving position, a member movable in a fixed path lengthwise of said conveyor, a second member connected with the first mentioned member for movement therewith and for movement with relation thereto in a path transverse to said conveyor, a third member mounted on said second member for pivotal movement with relation thereto, means for supporting said inserting element on said third member, means controlled by the movement of said second member to move said third member about its pivotal axis, cams connected respectively with said first mentioned member and said second member to impart said movements thereto, and means for actuating said cams and said conveyor in timed relation one to the other.

22. In a mechanism for inserting a sleeve in the valve of a bag, means for moving valved bags successively to a sleeve receiving position, a sleeve inserting element, means for moving said inserting element into and out of the valve of a bag in said sleeve receiving position, means for moving sections of sleeve forming material successively into a position to be engaged by said inserting element as the latter moves towards said bag, means for actuating said material moving means, and means controlled by the bags as they move to sleeve receiving position to prevent the operation of said material moving means when there is no bag in sleeve receiving position.

23. In a mechanism for inserting a sleeve in the valve of a bag, means for moving valved bags successively to a sleeve receiving position, a sleeve inserting element, means for moving said inserting element into and out of the valve of a bag in said sleeve receiving position, means for moving sections of sleeve forming material successively into a position to be engaged by said inserting element as the latter moves towards said bag, a driving shaft, a driving member connected with said shaft for rotation therewith, a driven member operatively connected with said material moving means, a movable member normally connecting said driven member with said driving member for rotation therewith, means for actuating said movable member to disconnect said driven member from said driving member and including a normally inoperative member, and means controlled by said bags to move said inoperative member to an operative position and thus prevent the operation of said material moving means when there is no bag in sleeve receiving position.

24. In a mechanism for inserting a sleeve in the valve of a bag, means for moving valved bags successively and in evenly spaced relation to a sleeve receiving position, a sleeve inserting element, means for moving said inserting element into and out of the valve of a bag in said sleeve receiving position, means for moving sections of sleeve forming material successively into a position to be engaged by said inserting element as the latter moves toward said bag, a driving shaft, a disk-shaped driving member mounted on said shaft for rotation therewith, a driven member loosely mounted on said shaft, means for drivingly connecting said driven member with said material moving means, said driving member having a shoulder, a pawl pivotally connected with said driven member and normally engaged by said shoulder to drive said driven member, said pawl having a part extending laterally beyond said shoulder, a trip finger movably supported on a fixed support adjacent said driving member, a lever loosely mounted on said shaft and having a part movable to a position to support said trip finger in the path of said pawl as the latter rotates with said driven member and thus move said pawl out of engagement with said shoulder, and means controlled by said bags as they move toward said sleeve receiving position to move said part of said lever to said trip finger supporting position when there is excessive space between the bag that is in sleeve receiving position and the bag next following the same.

25. In a mechanism for inserting a sleeve in the valve of a bag, means for supporting valved bags successively with their valves in a position to receive a sleeve, a sleeve inserting element movable into and out of said valves, means for actuating said inserting element, a web feeding device, a device beyond said web feeding device to sever an end section of said web, and a supplemental feeding device beyond said severing device timed to engage said web prior to the severance of said end section, to hold the web taut during the severing operation, to advance the severed section into the path of said inserting element, and to release said severed section as said inserting element moves into engagement therewith.

26. In a mechanism for inserting a sleeve in the valve of a bag, means for supporting valved bags successively with their valves in a position to receive a sleeve, a sleeve inserting element movable into and out of said valves, means for actuating said inserting element, a web feeding device, a device beyond said feeding device to form a slit in the end portion of said web and to then sever the slitted portion from said web, a device beyond said severing device including a rotatable segment timed to engage the end portion of said web prior to the slitting thereof to hold said web taut during the slitting and severing operations, to move the severed portion of said web into the path of said inserting element and release the same as said inserting element moves into engagement therewith.

27. In a mechanism for inserting a sleeve in the valve of a bag, means for moving valved bags successively to a sleeve receiving position, a sleeve inserting element movable toward and from said sleeve receiving position, means for successively positioning sections of sleeve forming material in the path of said inserting element, means for actuating said inserting element to move said section of material into the valve of a bag which is in said sleeve receiving position, and means for separating the end portions of the side walls of said bag to facilitate the insertion of the sleeve in the valve.

28. In a mechanism for inserting a sleeve in the valve of a bag, means for moving valved bags successively to a sleeve receiving position, a sleeve inserting element movable toward and from said sleeve receiving position, means for successively positioning sections of sleeve forming material in the path of said inserting element, means for actuating said inserting element to move said section of material into the valve of a bag which is in said sleeve receiving position, and a hold-down device to engage the upper side wall of said bag on a line spaced from the valved end thereof to separate the end portions of the side walls of said bag.

HARRY PETERS.
CLYDE D. PIERSON.

REFERENCES CITED

The following references are of record in the file of this patent:

UNITED STATES PATENTS

| Number | Name | Date |
|---|---|---|
| 1,780,720 | Redington | Nov. 4, 1930 |
| 1,908,291 | Goss | May 9, 1933 |
| 1,926,421 | Andreas | Sept. 12, 1933 |
| 2,232,239 | Jaeger | Feb. 18, 1941 |
| 2,387,274 | Lee | Oct. 23, 1945 |